July 25, 1950 H. P. KALMUS 2,516,393

TEMPERATURE-COMPENSATED VIBRATORY SYSTEM

Filed June 28, 1948 2 Sheets-Sheet 1

HENRY P. KALMUS
*INVENTOR.*

BY Bruce L. Birchard

HIS AGENT

July 25, 1950 H. P. KALMUS 2,516,393

TEMPERATURE-COMPENSATED VIBRATORY SYSTEM

Filed June 28, 1948 2 Sheets-Sheet 2

HENRY P. KALMUS
INVENTOR.

BY Bruce L Birchard
HIS AGENT

Patented July 25, 1950 2,516,393

UNITED STATES PATENT OFFICE 2,516,393

TEMPERATURE-COMPENSATED VIBRATORY SYSTEM

Henry P. Kalmus, Washington, D. C., assignor to Zenith Radio Corporation, a corporation of Illinois Application June 28, 1948, Serial No. 35,726

6 Claims. (Cl. 179—100.41)

This invention relates to vibratory systems, such as vibrators, electro-mechanical transducers, synchronized rectifiers, and the like. It is a primary object of the invention to provide improved temperature compensated apparatus of this type.

The invention is particularly adaptable to signal translating apparatus of the type in which vibrations of a member at audio frequencies produce corresponding variations in current in an associated electrical circuit. More particularly, the invention may be applied to advantage in mechano-electrical transducers such as phonograph pickup devices and associated apparatus, in which vibrations of a member at audio frequencies produce modulation of a high frequency wave. It is an important object of this invention to provide an improved type of mechano-electrical transducer.

In my co-pending application, Serial No. 585,826, filed March 31, 1945, now U. S. Patent No. 2,489,378, granted November 29, 1949, for Modulated-Oscillator Type Phonograph Reproducing System, and assigned to the same assignee as the present application, there is disclosed and claimed as a preferred embodiment a novel type of phonograph pickup, wherein a member is vibrated in accordance with the undulations of a record disc thereby to vary the impedance of a winding associated with the member, and to produce corresponding variations in the amplitude of oscillations generated in a tuned circuit including such winding. The frequency response of a system such as that disclosed and claimed in my aforementioned co-pending application is characterized by a substantial variation with changes in ambient temperature, for reasons to be hereinafter more thoroughly explained. While a pickup of this type is entirely satisfactory for most commercial applications, it is desirable in some applications of a more precise nature to provide a signal translating apparatus which has a frequency response characterized by a substantial invariance with changes in ambient temperature.

It is an important object of the present invention, therefore, to provide an improved signal translating apparatus, such as a phonograph pickup, of the type disclosed in the aforementioned copending application, the frequency response of such improved apparatus being characterized by a substantial invariance with changes in ambient temperature.

In the co-pending application of Henry P. Kalmus and Robert Lee Price, Serial No. 24,506, filed May 1, 1948, for Signal Translating Apparatus, and assigned to the same assignee as the present application, there is disclosed and claimed as a preferred embodiment a high fidelity phonograph pickup system which affords a frequency response characteristic free of abrupt changes and including frequencies up to the vicinity of 10,000 cycles per second. Apparatus of this nature is particularly useful where high fidelity reproduction is desired, and, for optimum performance, should afford a frequency response characteristic which is substantially stable and independent of the ambient temperature.

It is, therefore, a further important object of the present invention to provide a high fidelity phonograph pickup having a frequency response, which includes frequencies up to the vicinity of 10,000 cycles per second and which is, at the same time, substantially independent of changes in ambient temperature.

It is a still further important object of the invention to provide such a phonograph pickup which is particularly well adapted to rapid and economical construction on a mass production basis.

With the structure set forth in my previously identified copending application, Serial No. 585,826, now Patent No. 2,489,378, granted November 29, 1949, the vane or vibratory member is forced to operate in its second mode of vibration by solidly securing the upper end of the vane in a block of solid plastic material. Under these conditions, the vane is caused to vibrate in its second mode with maximum amplitude; a damping block, such as a piece of plasticized cellulose nitrate, is mounted adjacent the central portion of the vane to limit the displacement thereof to a fixed predetermined amount. With this arrangement, the elastic hysteresis of the damping material is found to decrease with an increase in ambient temperature, which results in a corresponding decrease in the damping effect. Consequently, considerable changes in the frequency response are effected by changes in the surrounding temperature. Specifically, the frequency of natural mechanical resonance of the vibratory member is decreased, and its amplitude of vibration is increased, with an increase in ambient temperature.

In accordance with the present invention, the upper end of the vane is substantially completely suspended between a pair of mounting blocks constructed of material having a similar elastic hysteresis-temperature characteristic to that of the damping block. Alternatively, the upper end of the vane may be embedded in a single mounting block of such material. As a still further alternative, the mounting means and damping means may comprise a unitary block of suitable material. In this manner, the decrease in damping effect of the material adjacent the central portion of the vane with an increase in ambient temperature is compensated by the decrease in elastic hysteresis of the material in which the upper end of the vane is mounted; as the temperature increases, the material in which the upper end of the vane is mounted loosens up, with the result that the needle becomes more poorly secured, and the amplitude of vibration of the center of the vane is decreased. The increase in vibration amplitude due to the decreased damping effect of the damping material and the decrease in vibration amplitude due to the loosening up of the mounting material may be made substantially complementary by employing damping means and mounting means of substantially similar elastic hysteresis-temperature characteristics. The physical proportions of the damping means and the mounting means have been found to be not critical.

While the term "elastic hysteresis" has been employed to signify the damping properties of the damping and mounting blocks, it is recognized that viscous friction may play an important part in the actual physical damping effect. The elastic hysteresis effect is substantially a function of amplitude, while the viscous friction damping effect is substantially a function of velocity. It is believed that the elastic hysteresis effect is the predominant of the two. At any rate, in the specification and in the appended claims, the term "damping modulus" is employed to set forth the overall damping properties, such damping modulus including both the coefficient of elastic hysteresis and the coefficient of viscous friction, and being defined as the imaginary component of the complex Young's modulus of the material.

The features of the present invention which are believed to be novel are set forth with particularity in the appended claims. The invention, together with further objects and advantages thereof, may more readily be understood, however, by a reference to the following description taken in connection with the accompanying drawings, in which like reference numerals indicate like elements, and in which:

Figures 5, 6*a*, 6*b*, 7*a*, and 7*b* are schematic diagrams of mechanical and electrical analogues.

Figure 3:
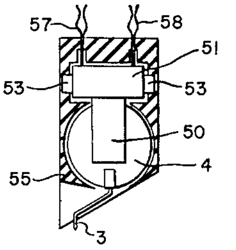
Figure 3 is a sectional view of a preferred construction for a pickup system which may be employed with the tone arm shown in Figure 2.
Figure 4:
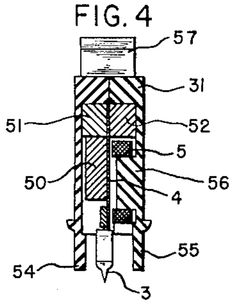
Figure 4 is a transverse sectional view of the construction of Figure 3.
Figure 8:
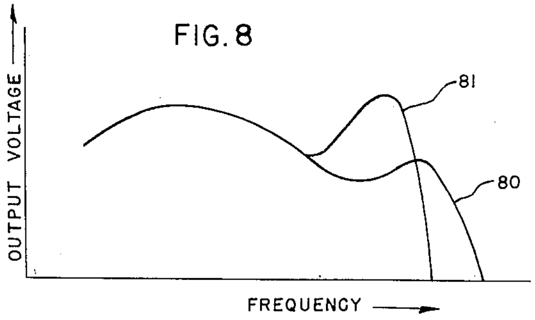

Figure 8 is a graphical representation of a characteristic of the system shown in Figures 3 and 4.

Figures 6A, 6B, 7A, 7B, 9:
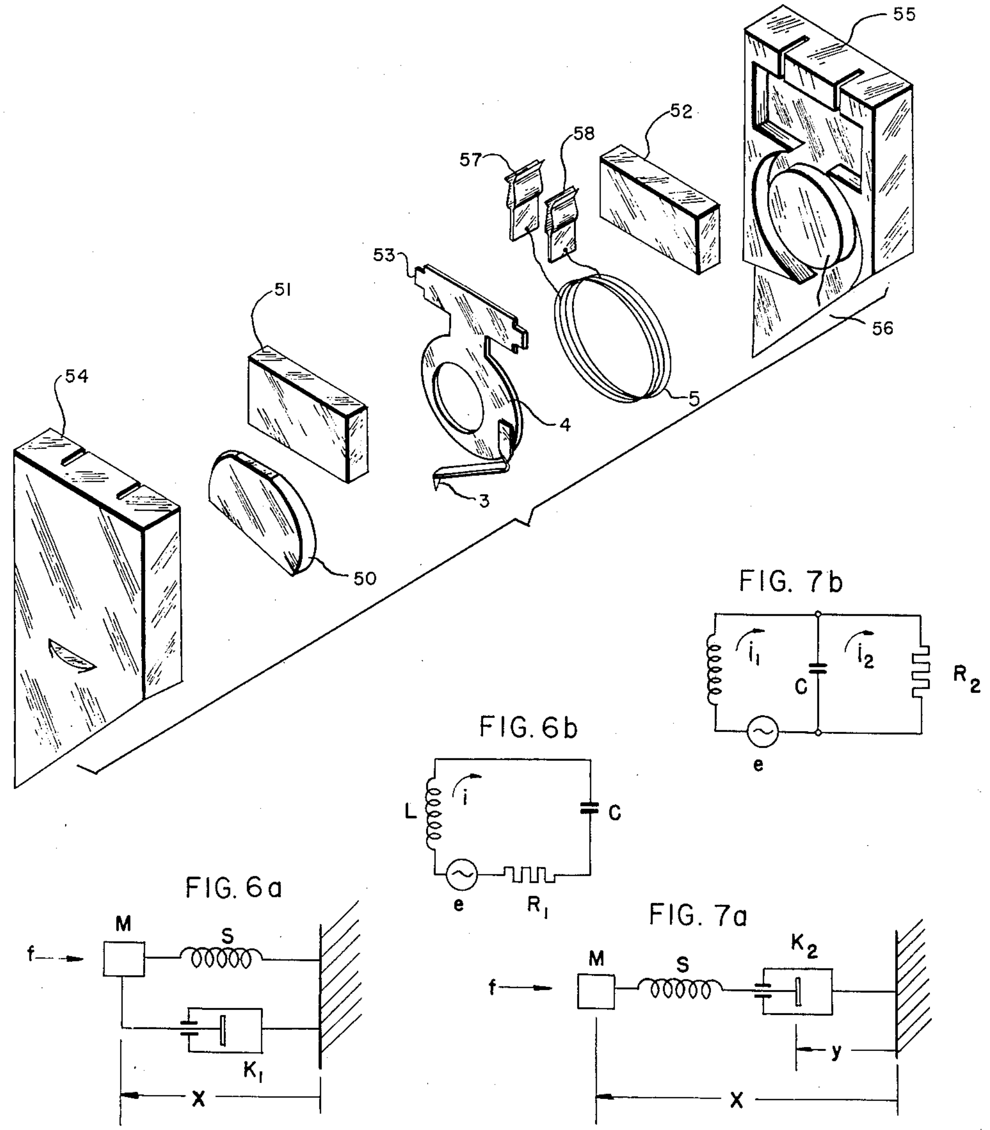

Figure 9 is an exploded view of another embodiment of the invention.

Figure 1:
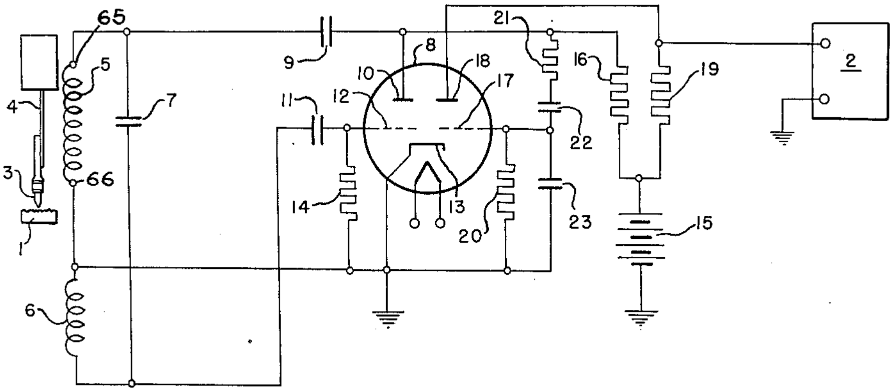
Figure 1 is a schematic representation of an electrical circuit which embodies the present invention.

The apparatus described herein, set forth by way of example of one kind of apparatus which may embody the present invention, is arranged as shown in Figure 1 to transform intelligence recorded on a record disc 1 into suitable current variations of audible frequency in a utilization or amplifying device 2.

The intelligence on record disc 1 is in the form of laterally cut impressions of undulating character in which a suitable stylus 3 travels as the record disc 1 is rotated by conventional means, whereby a vibratory member 4 attached to the stylus is vibrated to produce corresponding changes in the impedance of an inductance element or coil 5. Coil 5 is coupled to the vibratory member 4, whereby cyclical mechanical movement of the stylus 3 produces corresponding changes in the impedance of the inductance element 5.

Coil 5, whose effective resistance or inductance may be cyclically altered by corresponding movement of stylus 3, constitutes one element of a single tuned circuit 5, 6, 7 in an oscillatory circuit including an electron discharge device 8, shown here as a twin triode. The first triode section of device 8, together with its associated circuits, functions not only as an oscillation generator, but also as a demodulator or detector, in a manner hereinafter to be described.

The circuit formed by the serially connected inductances 5 and 6 is connected in parallel with a capacitance 7 to form a parallel tuned circuit 5, 6, 7. One terminal of the tuned circuit is connected through a coupling capacitance 9 to the anode 10 of the first triode section of device 8. The other terminal of the tuned circuit is connected through a grid coupling capacitance 11 to the control grid 12 of the first triode section of device 8. The junction point of inductance elements 5 and 6 is connected to the common grounded cathode 13 of device 8. A grid leak resistance 14 is connected between control grid 12 and cathode 13, and serves to impress a suitable biasing potential on the control grid 12. Suitable positive unidirectional operating potential is provided for the anode 10 through a load resistance 16 from the positive terminal of a suitable source, here shown as a battery 15, the negative terminal of which is grounded.

The operation of the electrical circuit thus far described is as follows. The first section of device 8, including anode 10, grid 12, and cathode 13, produces a sustained oscillatory current of substantially constant amplitude in the tuned circuit 5, 6, 7 in a well-known fashion, assuming that the vibratory member or vane 4 remains motionless. Movement of vane 4, such as might be effected for example by stylus 3 traveling in a conventional phonograph record sound track, produces cyclical changes in the impedance of inductance element 5. These impedance changes, being of a nature corresponding to the undulations of the record disc 1, result in amplitude modulation of the oscillatory current produced by the tuned circuit in such a manner that the recorded intelligence is reproduced in the output of the first triode section of device 8. The values of coupling capacitance 11 and grid leak resistance 14 are so chosen that the bias voltage developed at the grid causes the first triode section to function as a plate-bend detector for demodulating the amplitude modulated oscillations appearing at the control grid 12. The modulation components resulting from such plate-bend detection appear across load resistance 16. Thus, the first triode section of device 8 serves to produce oscillations which are modulated in accordance with the undulations of a record disc, and simultaneously to demodulate or detect the modulated oscillations so produced.

The detected output of the first triode section is applied to the second section of device 8, which includes the common cathode 13, a control grid 17, and an anode 18. Anode 18 is supplied with suitable positive unidirectional operating potential from source 15 through a load resistance 19. Control grid 17 is maintained at a suitable bias potential with respect to the common cathode 13 by means of a grid leak resistance 20 connected between grid 17 and ground. The modulation components appearing across load resistance 16 are coupled to the control grid 17 by means of a series circuit comprising a filter resistance 21 and an isolating and coupling capacitance 22, a filter capacitance 23 being provided between grid 17 and ground. Filter capacitance 23 serves to bypass any oscillation frequency components appearing across load resistance 16. The second section of device 8 serves as an amplifier, substantially all of the amplified voltage appearing across load resistance 19 being of a frequency corresponding to the vibration frequency of vane 4. The amplified voltage appearing across load resistance 19 is then applied to further amplifying means or utilization device 2.

The vibratory member or vane 4, which is coupled to coil 5, is constructed preferably of a high resistance material; in one form of the present invention, the material used is .004-inch thick stainless steel known in the trade as American Iron and Steel Institute Type No. 302. Stainless steel type 302 contains about 18% chromium, about 8 or 9% nickel, about 0.08 to 0.2% carbon, traces of manganese, silicon, phosphorus, sulphur and copper, the remainder being iron. This material is preferred because it is substantially non-magnetic; thus a minimum amount of 120-cycle hum is introduced into the pickup from nearby motors, transformers and the like. It has been found that stray 60-cycle fields shift the working point on the magnetization curve of the vibratory member, when it is made of magnetic material, thus resulting in undesired changes in the inductance and effective resistance of the coil 5. These undesired changes produce undesired amplitude modulation of the oscillatory current. For these reasons, it is preferred to use a material possessing high resistance and low permeability. When such material is used, the desired modulation is produced substantially entirely by eddy current loss in the high resistance material, and the desired modulation is substantially unaffected by variations of permeability of member 4 in the presence of stray fields.

Amplitude modulation of the oscillations appearing in tuned circuit 5, 6, 7 in response to undulations on the record disc 1 results because of two effects. First, the quality factor or Q of the inductance element 5 is cyclically changed. In the second place, the amount of feed-back voltage from the anode 10 to the grid 12 is cyclically changed due to cyclical changes in the impedance of inductance element 5. The inductance of coil 5 is preferably made less than the inductance of coil 6 in order that, when the impedance of coil 5 is altered, the feed-back factor is altered in such a way that amplitude modulation produced by inductance change is in phase with, and thus reinforces, the amplitude modulation produced by the change in Q.

Viewed in another way, the inductances 5 and 6, taken in connection with capacitance 7, form a pi network through which oscillation voltage is transferred from anode 10 to grid 12. In the usual forms of electron discharge oscillation generators, such as the type illustrated, there need be only a part of the voltage on the anode fed back to the control grid, and, in order to maintain the generator in operation, the voltage so fed back must be maintained within certain limits. That is, if the amount of voltage fed back to the control grid is too slight, the generator ceases to oscillate. In the illustrated system, the feed-back is maximum, and the intensity of oscillation is correspondingly maximum, when the impedances of coils 5 and 6 are equal. The pi network 5, 6, 7 is effective to alter in a substantial degree the amount of voltage fed back from anode 10 to grid 12 as the impedance of inductance 5 changes. In other words, variation in the impedance of coil 5 produces relatively large changes in the ratio of voltage across coil 6 to the voltage across coil 5 when the impedance of coil 5 is much smaller than the impedance of coil 6.

In the preferred system, vane 4 is constructed of a conductive material having a high specific resistance. To make it magnetic as well as conductive is useful when the member 4 need not be used in the presence of stray magnetic fields and when it is desired to reduce or eliminate inductance changes in coil 5. Also, to make member 4 magnetic introduces hysteresis loss which aids the eddy current effect in member 4 to change the effective resistance of coil 5, and consequently, the oscillation intensity.

The oscillator-detector arrangement shown in Figure 1 is substantially identical to that disclosed and claimed in my co-pending application, Serial No. 662,044, filed April 13, 1946, now U. S. Patent No. 2,489,379, granted Nov. 29, 1949, for Modulated-Oscillator Type Signal Translating Apparatus, and which application is assigned to the same assignee as the present application. In general, in an arrangement such as that shown in Figure 1, both grid detection and plate-bend detection take place in the first section 10, 12, 13 of triode 8. As these two types of detection act differentially in the anode circuit, the output which can be obtained is limited. It has been found that if the values of capacitance 11 and resistance 14 are properly chosen, so as to prevent the bias voltage impressed on grid 12 from fluctuating substantially at an audio frequency rate, no grid detection occurs. A much larger audio frequency signal is then developed in the anode circuit of device 10, 12, 13, resulting in a greatly improved ratio between the desired signal and tube noise due to thermal agitation effects. It has also been found that if the values of capacitance 11 and resistance 14 are properly chosen, so as to enable the bias voltage impressed on grid 12 to fluctuate at a rate corresponding to the rotational speed of the record disc 1, the amplitude distortion of the modulated oscillations due to eccentricity of the record disc may be balanced out through variation of the detecting efficiency in a manner complementary to the non-linear characteristic of the modulator and transducer.

Cyclical changes in the inductance of element 5 cause a certain amount of frequency modulation of the generated wave in tuned circuit 5, 6, 7, but the plate-bend detector is substantially unresponsive to frequency modulation, due to the presence of only one tuned circuit, detection of frequency modulation being dependent on the comparison of the voltages appearing across a pair of oscillatory circuits tuned to different frequencies. Consequently, substantially only those components which produce amplitude modulation are detected and appear across load resistance 16.

In the preferred embodiment of the invention shown in Figure 1, the movement of the vane 4 in response to undulations in the record disc 1 is used to change the impedance of coil 5. While it is permissible to use vane 4 to drive coil 6, undesired distortions of the input signals are applied directly to the input circuit of the plate bend detector, whereas by using coil 5 as the driven coil, such undesired distortion is effectively isolated from the grid 12.

Figure 2:
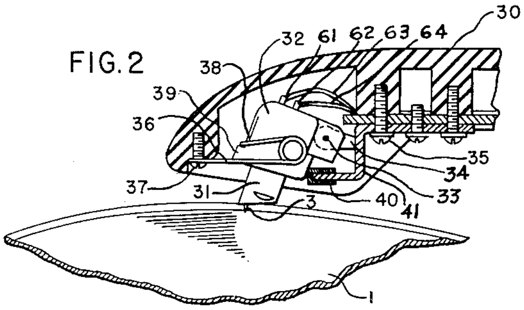
Figure 2 is a fragmentary view, partly in section, of a tone arm cooperating with a record disc.

There is shown in Figure 2 a fragmentary view, partly in section, of a tone arm cooperating with a record disc. A tone arm 30, pivotally mounted at one end (not shown) carries a pickup 31 constructed in accordance with the invention. The stylus 3 cooperates with the sound track on the record disc 1. The casing holder 32, which contains pickup 31, is pivotally mounted about the axis of a fixed pin 33 in a pair of arms 34 disposed on opposite sides of the casing holder 32. Each arm 34 has one end thereof fastened to the tone arm 30, as shown for example by means of a screw 35, and the other end thereof circularly formed to provide a bearing member for pin 33. Arms 34 may be flexible, although it is preferred that they be non-flexible.

The casing holder 32 is normally spring-biased downwardly for rotation about the axis of pivot pin 33 by means of a coil spring 36 having its ends fastened to the tone arm 30, as shown for example by means of a screw 37. The coil spring 36 has an intermediate portion 38 which engages a shoulder 39 on the holder 32 to press the holder downwardly in the direction of counter-clockwise rotation about pin 33.

Spring 36 is made sufficiently flexible to protect the pickup unit against injury in the event that the tone arm is dropped on a record disc. In such a case, the pickup unit including the casing holder 32 is deflected upwardly against the action of the weak spring 36, and the heel of unit 31 engages the record; an arm 41, to the free end of which is secured a piece of felt 40, is fastened to the tone arm 30 by means of screw 35 to serve as a stop for limiting the movement of holder 32. This retractability feature is particularly claimed in Patent No. 2,444,218, issued on June 29, 1948 to Chalon W. Carnahan, and assigned to the present assignee.

In Figures 3 and 4, there is shown a preferred construction for the casing or cartridge 31 of Figure 2. The vibratory member 4 is of the stainless steel type previously mentioned for reducing to a minimum the amount of extraneous 120-cycle hum introduced into the system and of a thickness of approximately .004 inch. The stylus or needle 3 is spot welded or otherwise securely fastened to the vane 4; vertical compliance may be provided by bending the stylus 3 to form a Z-shaped member as shown. Suitable damping means, such as a damping block 50 of plasticized cellulose nitrate, is securely fastened adjacent the central portion of the vane 4, thereby to limit the displacement thereof to a predetermined maximum amount and to minimize twisting about the vertical axis.

For optimum performance, it is important that damping block 50 be well secured to the body of the vane 4. This condition may be insured by melting the damping block onto the vane; by dipping the damping block in acetone momentarily, applying it to the vane, and allowing it to harden; by the use of suitable cementing material; or by other suitable means.

In accordance with the present invention, the upper end of the vibratory element 4 is substantially completely suspended between a pair of mounting blocks 51 and 52 formed of the same material as that of the damping block 50, or of some other material having similar properties. Alternatively, the vibratory element 4 may be embedded in a single mounting block of such material, or, as a further alternative, the mounting means and damping means may be formed of a unitary structure of suitable material such as plasticized cellulose nitrate. It is therefore contemplated, throughout the specification and the appended claims, that the phrase "substantially completely suspended between a pair of mounting blocks" (or equivalent phrases) include such alternatives.

The vane 4 is provided with a pair of laterally extending portions 53 of very small cross-section, the purpose of portions 53 being merely to locate the vane 4 in position between two halves 54 and 55 of a plastic casing which comprises the cartridge 31, the two halves being held together by cement or the like therebetween, or by bonding as by heat and pressure. Inductance coil 5 is mounted on a coil form 56 which is fastened by cement or the like to, or integrally formed with, the inside wall of casing half 55 in magnetic relationship to vibratory member 4, circular coil form 56 and the circularly shaped intermediate portion of the vane 4 being substantially coaxial.

Inductance coil 5 has its opposite leads permanently connected respectively to metallic contact elements 57 and 58 which are embedded in, and extend from the inside to the outside of, cartridge 31, the outer ends of contact elements 57 and 58 being adapted to make good electrical and mechanical contact with corresponding contact elements 61 and 62 (Figure 2) embedded in and extending through the casing holder 32. Leads 63 and 64, permanently fastened respectively to the upper ends of contact elements 61 and 62, extend through at least part of the tone arm 30 to the appropriate terminals 65 and 66 in the oscillator circuit of Figure 1.

The replaceable casing or cartridge 31, which may be sold as an article of commerce, contains in a unitary structure the vibratory member 4 and coil 5 magnetically coupled thereto in predetermined space relationship and is held as a unit snugly in the casing holder 32.

The view shown in Figure 4 is a transverse section of the embodiment of Figure 3, and is included in order more completely to illustrate the preferred construction of the cartridge 31.

The operation of the present invention comprises automatic compensation for changes in frequency response due to changes in the ambient temperature. With the mounting as shown, the vibratory element or vane 4 is mechanically resonant at a frequency at or about 4,000 cycles per second, such vibration occurring in the second mode. At this frequency the mode of vibration is such that the ends of the vibratory member remain substantially stationary, and the middle portion adjacent the inductance element 5 vibrates with relatively large amplitude. The result of this resonant vibration is that the response at the natural mechanical resonance frequency is large, and the response at higher frequencies is rapidly attenuated. In order that the amplitude of vibration at the resonant frequency be not too large, damping block 50, formed for example of plasticized cellulose nitrate, is provided adjacent the middle portion of the vane and in abutting relationship with the bottom surface of the mounting block 51. Plasticized cellulose nitrate is preferred over ordinary rubber since it possesses more internal friction and less compliance per unit volume.

In the preferred embodiment as set forth above, it is apparent that the damping effect of damping block 50 is reduced in response to an increase in the surrounding temperature, such decrease in damping effect being due to a decrease in the damping modulus of the damping material and resulting in a variance, with changes in ambient temperature, of the response characteristic. By substantially completely suspending the upper end of the vane 4 between a pair of mounting blocks 51 and 52 of material similar to the damping material, temperature compensation may be effected, with the result that the frequency response characteristic is substantially independent of changes in ambient temperature. As the temperature increases, the damping modulus of the mounting blocks decreases and the needle becomes more poorly secured, with the result that the amplitude of vibration at the center of the vane is decreased in response to a temperature increase. By proper selection of the structure of the damping block 50 and the mounting blocks 51 and 52 and the vibratory element 4, the two effects may be made complementary.

Viewed in another way, mounting blocks 51 and 52 support vane 4 at a high motional impedance portion and provide suspension-damping, and damping block 50 is supported adjacent a low motional impedance portion of vane 4 and provide velocity-damping. By constructing the mounting blocks 50 and 51 and damping block 50 of the same material, or of different materials having substantially identical damping modulus-temperature characteristics, the changes in suspension-damping and the changes in velocity-damping with ambient temperature variations may be made complementary, thereby rendering the overall response characteristic of the vibratory system substantially independent of ambient temperature.

Figure 5:
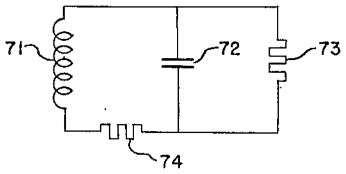

There is shown in Figure 5, in schematic form, a circuit diagram of an electrical analogue which may be useful in explaining the operation of the present invention. The mechanically resonant vane 4 (Figure 3) is represented by an equivalent electrical resonant circuit comprising an inductance 71 and a capacitance 72 connected in parallel and tuned to resonate at the frequency of mechanical resonance of member 4. The damping block 50 (Figure 4) is represented in the analogue by a damping resistance 74 connected in series with the resonant circuit. As the ambient temperature increases, the resistance of damping element 74 decreases, with the result that the amplitude of oscillation of the resonant circuit is increased. That portion of the circuit thus far explained may be considered to be analogous to an uncompensated system.

The temperature compensating action attained by the use of the present invention, namely by substantially completely suspending the upper end of the vane 4 between a pair of mounting blocks having a damping modulus-temperature characteristic substantially similar to that of the damping block 50 (Figure 4), may be represented by a resistance element 73 shunting the resonant circuit comprising inductance 71 and capacitance 72. As the ambient temperature increases, the resistance of element 73 also decreases, and this results in a decrease in the amplitude of oscillation of the resonant circuit. It is seen, then, that the effects of resistances 73 and 74 upon the amplitude of oscillation of the circuit are opposite in nature, and by suitably proportioning these resistances, it is possible to obtain substantially complete temperature compensation.

That the circuit shown in Figure 5 is an accurate electrical analogue of the mechanical system shown in Figures 3 and 4 may readily be shown by reference to Figures 6*a*, 6*b*, 7*a* and 7*b*.

Referring now to Figure 6*a*, the mechanical system of Figures 3 and 4, less the mounting blocks 51 and 52, is shown in schematic form. In Figures 6*a*, M represents the mass of the system, S represents the system compliance, $K_1$ represents the damping modulus of damping block 50 (Figures 3 and 4), $x$ represents the displacement of the system from a position of equilibrium, and $f$ represents the force acting on the system when the displacement is represented by $x$. This mechanical system is substantially that of an uncompensated system. The force $f$ exerted on the system may be conventionally represented as comprising three components; namely, a spring force component, a damping force component and an inertia force component. The spring force $f_s$ is directly proportional to the displacement and may be represented by the equation $$f_s=Sx \qquad (1)$$

The damping force $f_k$ is directly proportional to the velocity and may be written as $$f_k=K_1\frac{dx}{dt} \qquad (2)$$

The inertia force $f_I$ is directly proportional to the acceleration and may be represented as $$f_I=M\frac{d^2x}{dt^2} \qquad (3)$$

The total force exerted on the system is equal to the total of the spring force, the damping force, and the inertia force, or $$f=f_s+f_k+f_I \qquad (4)$$

from which it follows that $$f=Sx+K_1\frac{dx}{dt}+M\frac{d^2x}{dt^2} \qquad (5)$$

Referring now to Figure 6*b*, there is shown an electrical circuit comprising a voltage source $e$ connected in series with an inductance L, a capacitance C, and a resistance $R_1$. The current flowing in the circuit is conventionally represented by the letter $i$. By conventional circuit analysis, as is known in the art, the voltage $e$ may be equated to the sum of the voltage drops appearing across the respective impedance elements, L, $R_1$, and C, or $$e=L\frac{di}{dt}+\frac{1}{c}\int idt+R_1i \qquad (6)$$

Remembering that the current $i$ is equal to the time derivative of the charge $q$, it follows that Equation 6 may be rewritten as $$e=\frac{1}{c}q+R_1\frac{dq}{dt}+L\frac{d^2q}{dt^2} \qquad (7)$$

By comparison of Equations 5 and 7, it is apparent that the systems shown in Figures 6*a* and 6*b* are analogous, the reciprocal of the capacitance C being analogous to the compliance S, the resistance $R_1$ being analogous to the damping modulus $K_1$, and the inductance L being analogous to the mass M.

Referring now to Figure 7*a*, there is shown in schematic form a mechanical system equivalent to the system shown in Figures 3 and 4, the damping block 50, however, having been omitted. In Figure 7*a*, $K_2$ represents the damping modulus of the mounting blocks 51 and 52 of the system of Figures 3 and 4, and $y$ represents the displacement associated with the damping modulus $K_2$. The significance of the other symbols is identical with that described in connection with Figures 6*a*.

By analysis similar to that used in connection with Figure 6*a*, remembering that the system of Figure 7*a* is a series mechanical system, it may be shown that the conditions defining this system may be represented by the equations $$f=M\frac{d^2x}{dt^2}+S(x-y) \quad (8)$$

and $$S(x-y)=K_2\frac{dy}{dt} \quad (9)$$

There is shown in Figure 7*b* an electrical system similar to that of Figure 6*b*, the resistance $R_1$ of Figure 6*b* having been omitted and a second resistance $R_2$ having been shunted across the resonant circuit comprising inductance L and capacitance C. In accordance with the classical methods employed in analysing multiloop circuits, the respective loop currents are represented by the letters $i_1$ and $i_2$. By conventional methods of analysis, the loop equations of the system of Figure 7*b* may be written as $$e=L\frac{di_1}{dt}+\frac{1}{c}\int(i_1-i_2)dt \quad (10)$$

and $$\frac{1}{c}\int(i_1-i_2)dt=R_2i_2 \quad (11)$$

Remembering again that the respective currents $i_1$ and $i_2$ may be represented as the time derivatives of the respective charges $q_1$ and $q_2$, it is apparent that Equations 10 and 11 may be rewritten as $$e=L\frac{d^2q_1}{dt^2}+\frac{1}{c}(q_1-q_2) \quad (12)$$

and $$\frac{1}{c}\int(q_1-q_2)=R_2\frac{dq_2}{dt} \quad (13)$$

Comparison of Equations 8 and 9 with Equations 12 and 13 shows that the electrical circuit of Figure 7*b* is analogous to the mechanical system of Figure 7*a*.

By combining the systems of Figures 6*b* and 7*b*, the circuit of Figure 5 is obtained, and this circuit therefore is analogous to the complete system shown and described in connection with Figures 3 and 4.

There is shown in Figure 8 a graphical representation of a typical frequency response characteristic of a phonograph pickup such as that shown in Figures 3 and 4. In Figure 8, curve 80 represents the frequency response characteristic obtained at some arbitrary ambient temperature $T_0$. In the case of an uncompensated system, with an increase in ambient temperature from $T_0$ to $T_0+\Delta T$, the frequency response characteristic is altered as shown at curve 81. From the curves it is apparent that, in an uncompensated system, an increase in ambient temperature results in an increase in the amplitude of the natural resonance peak and a decrease in the frequency of natural mechanical resonance.

In a system constructed in accordance with the present invention, however, a change in ambient temperature from $T_0$ to $T_0+\Delta T$, results in substantially no change in the frequency response characteristic, the response remaining essentially that shown as curve 80 throughout a comparatively wide range of ambient temperatures.

In the above-identified co-pending application of Henry P. Kalmus and Robert Lee Price, there is shown as a preferred embodiment a phonograph pickup having a frequency response characteristic including frequencies out to the vicinity of 10,000 cycles per second. This extension of the frequency response characteristic beyond the normal or usual 4,000 cycles per second rather sharp cut-off is attained by dividing the central portion of the vane 4 into two or more effectively discrete systems as to mass and compliance, each system having associated therewith a different natural resonant frequency. In the preferred embodiment, the effectively discrete systems are provided by means of an eccentric hole and an off-center needle mounting. In accordance with the present invention, such a high fidelity phonograph pickup may be temperature compensated in a manner similar to that shown and described in connection with Figures 3 and 4. Figure 9 is an exploded view of a replacement cartridge such as cartridge 31 of Figures 3 and 4 which incorporates both the high fidelity feature and the temperature compensation feature in a single unit.

While the principles of the present invention have been explained and the preferred embodiments of the invention have been shown and described in connection with a mechano-electrical transducer such as a phonograph pickup, it is to be clearly understood that the invention may be applied to other mechanical vibratory systems, such as vibrators, synchronized rectifiers, certain types of musical instruments, and the like. In such case, in accordance with the present invention, the vibratory element is substantially completely suspended at substantially its point of maximum motional impedance between a pair of mounting blocks of material similar to that forming the damping block located at or near the point of highest velocity of the vibratory element, in such manner that the alterations in frequency response with change in ambient temperature produced by changes in the damping moduli of the mounting block and of the damping block are substantially complementary.

While there have been shown and described certain present preferred embodiments of the invention, it is to be understood that numerous variations and modifications may be made, and it is contemplated, in the appended claims, to cover all such modifications as fall within the true spirit and scope of the invention.

I claim:

1. A temperature-compensated mechanical vibratory system comprising: a vibratile member having a high motional impedance portion and a low motional impedance portion; a suspension-damping block supporting said member at said high motional impedance portion; and a velocity-damping block having a damping modulus-temperature characteristic substantially identical to that of said suspension-damping block and supported adjacent said member at said low motional impedance portion.

2. A temperature-compensated mechanical vibratory system comprising: a vibratile member having a high motional impedance portion and a low motional impedance portion; a suspension-damping block supporting said member at said high motional impedance portion; and a velocity-damping block constructed of the same material as said suspension-damping block and supported adjacent said member at said low motional impedance portion.

3. A temperature-compensated mechanical vibratory system comprising: a vibratile member having a high motional impedance portion and a low motional impedance portion; a pair of oppositely disposed suspension-damping blocks abutting said member at opposite sides of said high motional impedance portion; and a velocity-damping block having a damping modulus-temperature characteristic substantially identical to that of said suspension-damping blocks and supported adjacent said member at said low motional impedance portion.

4. A temperature-compensated mechanical vibratory system comprising: a vibratile member having a high motional impedance portion and a low motional impedance portion; a suspension-damping block supporting said member at said high motional impedance portion; and a velocity-damping block having a damping modulus-temperature characteristic substantially identical to that of said suspension-damping block and affixed to said member at said low motional impedance portion.

5. A temperature-compensated phonograph pickup transducer comprising: a vibratile member having a high motional impedance portion and a low motional impedance portion; a stylus fixed to said member and adapted to track the undulations of a movable record medium; a suspension-damping block supporting said member at said high motional impedance portion; and a velocity-damping block having a damping modulus-temperature characteristic substantially identical to that of said suspension-damping block and fixed to said member at said low motional impedance portion.

6. A temperature-compensated phonograph pickup transducer comprising: an inductance coil; a vibratile member having a high motional impedance portion, and a low motional impedance portion adjacent said coil; a stylus fixed to said member and adapted to track the undulations of a rotatable record disc; a pair of oppositely disposed suspension-damping blocks abutting and supporting said member at opposite sides of said high motional impedance portion; and a velocity-damping block constructed of the same material as said suspension-damping blocks and affixed to said member at said low motional impedance portion.

HENRY P. KALMUS.

REFERENCES CITED

The following references are of record in the file of this patent:

UNITED STATES PATENTS

| Number | Name | Date |
|---|---|---|
| 1,678,116 | Harrison | July 24, 1928 |
| 1,689,339 | Harrison | Oct. 30, 1928 |
| 1,788,519 | Harrison | Jan. 13, 1931 |
| 2,336,241 | Gravley | Dec. 7, 1943 |
| 2,436,946 | Tatro | Mar. 2, 1948 |
| 2,444,218 | Carnahan | June 29, 1948 |

Certificate of Correction

Patent No. 2,516,393 July 25, 1950

HENRY P. KALMUS

It is hereby certified that error appears in the printed specification of the above numbered patent requiring correction as follows:

Column 11, lines 52 to 54 inclusive, for that portion of the equation reading $$\frac{1}{c}\int(q_1-q_2) \text{ read } \frac{1}{c}(q_1-q_2)$$

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*